(No Model.)
R. M. ROBERTS.
GLASS CARRYING TRUCK.
No. 524,909. Patented Aug. 21, 1894.
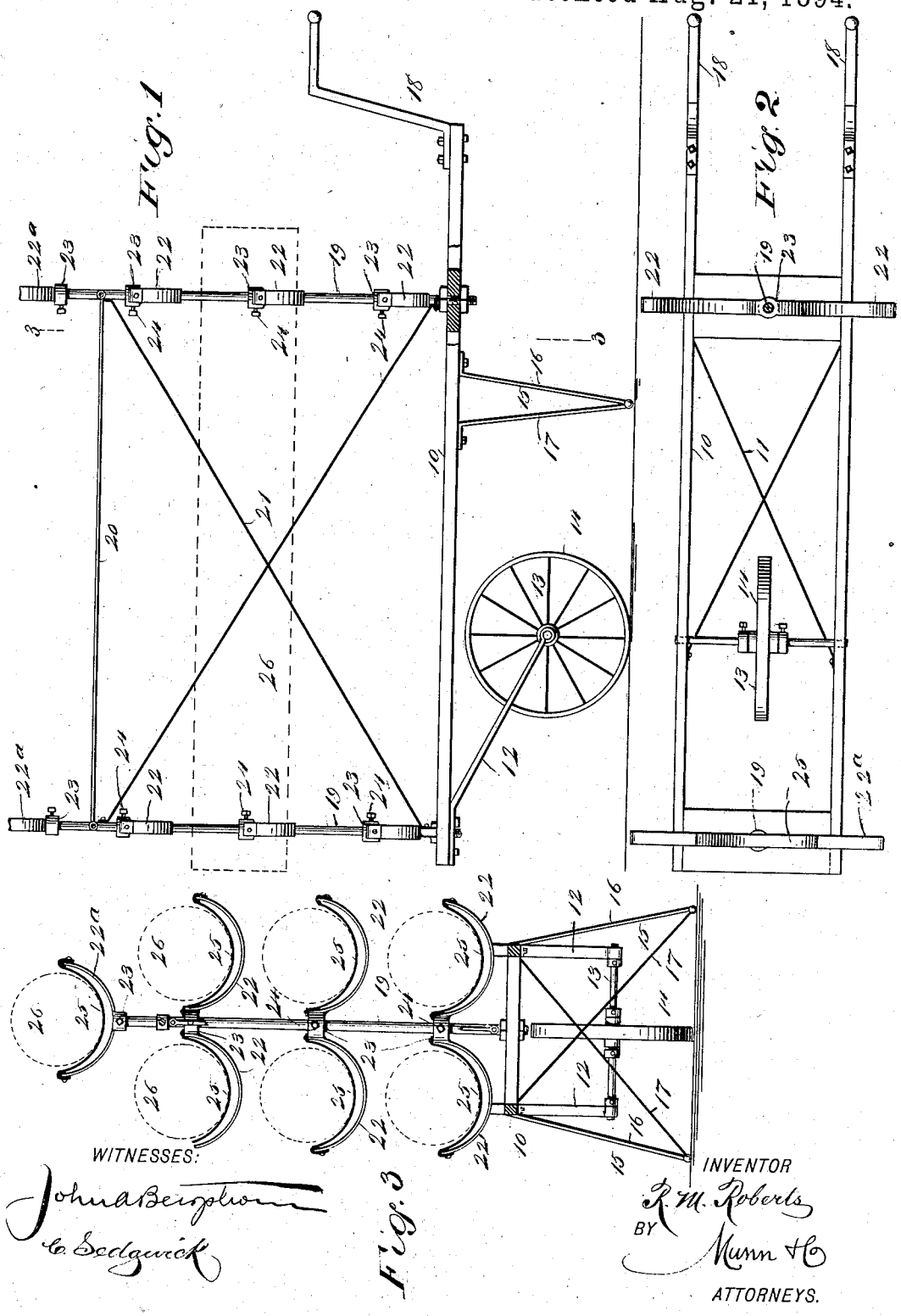
WITNESSES:
INVENTOR
R. M. Roberts
BY
Munn & Co
ATTORNEYS.

UNITED STATES PATENT OFFICE.

ROBERT M. ROBERTS, OF ANDERSON, INDIANA.

GLASS-CARRYING TRUCK.

SPECIFICATION forming part of Letters Patent No. 524,909, dated August 21, 1894.

Application filed December 30, 1893. Serial No. 495,203. (No model.)

*To all whom it may concern:*

Be it known that I, ROBERT M. ROBERTS, of Anderson, in the county of Madison and State of Indiana, have invented a new and improved Glass-Carrying Vehicle, of which the following is a full, clear, and exact description.

My invention relates to improvements in that class of vehicles which are used for transporting glass cylinders from the place in which they are blown to the place where further work is to be prosecuted on them, a vehicle of this class being shown in Letters Patent of the United States, No. 499,593, dated June 13, 1893.

The object of my invention is to produce a vehicle which is an improvement on the apparatus shown in the patent referred to, which improved vehicle is of very simple construction, has its body supported in such a manner that the cylinders carried by the vehicle cannot well be excessively jarred, and which is provided with means for supporting the cylinders on the body, in a safe and easy manner and in a longitudinal position with relation to the body, to the end that the vehicle may be conveniently wheeled through narrow places.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a broken side elevation, partly in section, of the vehicle embodying my invention. Fig. 2 is a plan view of the vehicle; and Fig. 3 is a vertical cross section on the line 3—3 of Fig. 1.

The vehicle is provided with a light frame or bed 10, which is preferably of rectangular shape, and is braced by the cross braces 11. The frame or bed has on the under side, at one end, leaf springs 12, which are secured firmly to the bed and extend diagonally downward beneath the bed, the lower ends of the springs being journaled on the shaft 13 of a wheel 14 on which the vehicle runs.

The front end of the vehicle is supported on legs 15, each comprising rods 16 and 17 fastened to opposite sides of the frame or bed and converging downward, the legs spreading, as shown clearly in Fig. 3, so as to have a suitable bracing effect when the vehicle is standing still and thus prevent the vehicle from being easily upset. The front end of the frame or bed 10 is also provided with parallel upwardly-extending bent handles 18, which may be grasped when the vehicle is to be moved, and by lifting the handles and then pushing or pulling thereon, the vehicle may be moved like an ordinary wheelbarrow.

The vehicle is provided, near opposite ends and near the center, with vertical posts 19 which are connected by braces 20 and 21, as clearly shown in Fig. 1. The posts 19 are each provided with laterally extending curved arms 22 which are arranged with their concave sides uppermost, and the arms are secured to collars 23 which are adjustable vertically on the posts and are held in place by set screws 24. On the top of each post is a single curved arm $22^a$ which is also provided with a collar 23 to facilitate its attachment to the post. The arms are each provided with cushions consisting of a strip of elastic webbing 25, which is shorter than the arms to which it is attached, and the webbing is fastened at its ends only to the ends of the arms and a space is thus left between the webbing and the arm so as to give the webbing a chance to stretch and completely serve its function of a cushion. The arms on the two posts are arranged at regular intervals apart, so that they will be of similar height, and the glass cylinders 26, which are to be carried by the vehicle, are laid on the arms as shown in Figs. 1 and 3, one end of a cylinder lying on an arm at one end of the vehicle and the other end of the cylinder lying on an arm at the other end of the vehicle.

It will be seen that the vehicle has sufficient capacity to carry quite a large number of cylinders; and from the foregoing description it will be understood that they may be safely and conveniently wheeled from place to place.

Having thus described my invention, I claim as new and desire to secure by Letters Patent—

1. A glass-carrying vehicle, comprising a suitable bed provided at each end with a vertical standard having cushioned arms to carry glass cylinders, a wheel arranged beneath one end of the bed, leaf springs secured to the bed and journaled on the axle of the wheel, and supporting legs at the other end of the bed, substantially as described.

2. A glass-carrying vehicle, comprising a portable bed, vertical posts at opposite ends of the bed, and laterally extending cushioned arms secured to the posts, substantially as described.

3. A glass-carrying vehicle, comprising a portable bed, vertical posts mounted thereon, laterally extending curved arms carried by the posts, and elastic cushions carried on the upper sides of the arms and secured to the arms at their ends, substantially as described.

4. A glass-carrying vehicle, comprising a bed or frame mounted at one end on a wheel and provided with supporting legs at the other end, vertical posts on the bed, and vertically adjustable and laterally extending cushioned arms carried by the posts, substantially as described.

ROBERT M. ROBERTS.

Witnesses:
ELLIS C. CARPENTER,
JOSEPH MORGAN, Jr.